June 5, 1928.
L. W. MITCHELL ET AL
1,672,226
HANDLE FOR HEATING DEVICES
Filed March 24, 1927
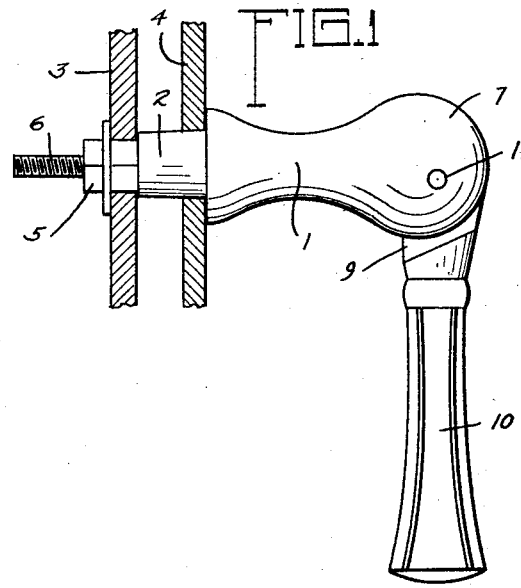
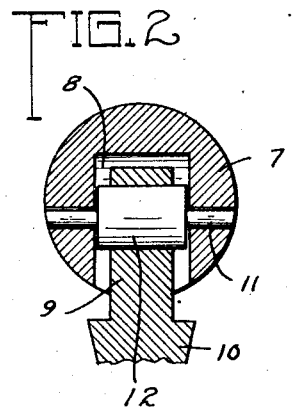
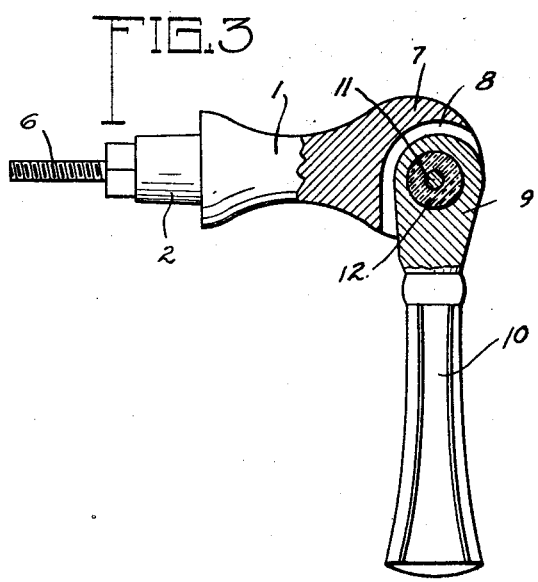
Leon W. Mitchell, INVENTORS
and John S. Wise,
BY Walter N. Haskell,
their ATTORNEY.

Patented June 5, 1928.

1,672,226

UNITED STATES PATENT OFFICE.

LEON W. MITCHELL AND JOHN T. WISE, OF ROCK ISLAND, ILLINOIS, ASSIGNORS TO ROCK ISLAND STOVE COMPANY, OF ROCK ISLAND, ILLINOIS.

HANDLE FOR HEATING DEVICES.

Application filed March 24, 1927. Serial No. 177,895.

Our invention has reference to a handle for heating devices, and is more specially designed for use with the doors of stoves and heaters of various types. It is not necessarily limited to such use, however, but can be employed with any object which is subjected to heat to such an extent that it is liable to become excessively hot, and impart such heat to a handle connected therewith.

There are at present on the market heating devices for domestic use which have an inner combustion chamber and an outer shell or casing of an ornamental design, frequently of such a formation as to conceal the true character of the heater. The use of wire coil handles and other handles of a non-ornamental pattern with the doors of such heating devices looks out of keeping with said type of heating devices, and such handles which are supposed to be non-heat-conducting are not satisfactory, but become as hot as the parts of the heater to which they are attached. The chief purpose of the present invention is to provide a handle having a heat insulation which will prevent the handle from becoming heated by radiation or induction from the part to which it is attached. It is also of a novel and pleasing pattern, making the same specially adapted for use with the higher class of heating devices before mentioned.

In the drawings;

Fig. 1 shows the invention in side elevation, as it appears when in use.

Fig. 2 is a cross-section through the head 7.

Fig. 3 is a longitudinal section of the connecting parts of the device.

The reference number 1 indicates a support, provided with a stem 2 for connection with the plates of a heater door, as shown at 3 and 4. The support is held in place by a nut 5 on the threaded pin 6 forming an extension of the stem 2. The support 1 is also provided with a head 7, in which is a recess 8, in which is pivoted the shank 9 of a pendent handle 10, by means of a pivot pin 11.

The shank 9 is spaced from the pin 11, and in such space is positioned a sleeve 12, formed of an asbestos fiber or similar material which will not readily conduct heat. The sleeve 12 is attached to the shank 9, and projects beyond said shank at each end, so as to preclude the possibility of any contact between the sides of said shank and the head 7. A sufficient space is also left between the end of said shank and the inner end of the recess, as shown in Figs. 2 and 3, so that the handle is in a thoroughly insulated position, with no possibility of heat transmission from the part 1 to the handle 10. The handle will thereby always be sufficiently cool to permit its being handled for operating the door of the heater.

Changes can be made in the form and arrangement of the invention without departing from the spirit thereof.

What we claim, and desire to secure by Letters Patent, is;—

A device of the class described, comprising a support adapted for attachment to a heat-conducting member, and provided with a recess in its outer end, a pivotal bearing transversely of said recess, a sleeve of non-heat-radiating material rockingly mounted on said pivot, and a handle provided with a shank attached to said sleeve, the sleeve projecting beyond the handle on both sides thereof, preventing contact between the handle and said support.

In testimony whereof we affix our signatures.

LEON W. MITCHELL.
JOHN T. WISE.